Sept. 25, 1945.　　　　W. M. MALOTT　　　　2,385,522
LUBRICATING SYSTEM
Filed May 16, 1942
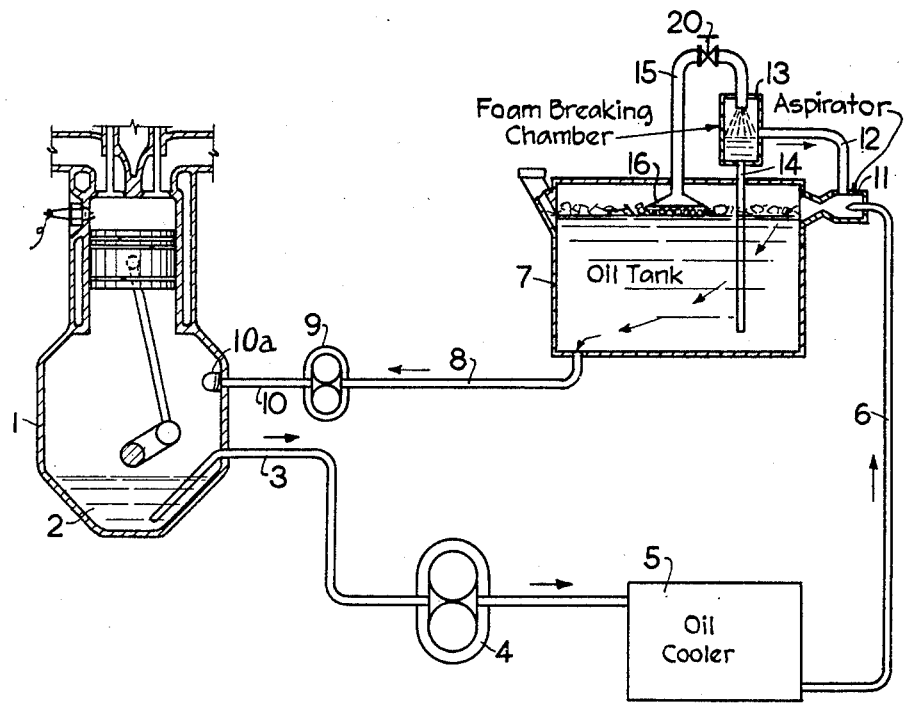
Inventor: William M. Malott
By his Attorney: H. Birch Patented Sept. 25, 1945

2,385,522

UNITED STATES PATENT OFFICE 2,385,522

LUBRICATING SYSTEM

William M. Malott, Lafayette, Calif., assignor to Shell Development Company, San Francisco, Calif., a corporation of Delaware Application May 16, 1942, Serial No. 443,287

3 Claims. (Cl. 184—6)

The present invention relates to an improved apparatus for inhibiting foam formation in lubricating systems.

In the operation of lubrication systems and particularly those of internal combustion engines there is often a tendency for foam to form, this tendency being particularly pronounced in the instance of aircraft engines.

In the field of lubricating systems, in general, lubricating oil foam formation if allowed to proceed unhindered will ultimately produce undesirable effects, due to improper lubricating of the machine which is being lubricated, or to more rapid deterioration of the lubricating oil, or both.

Foaming of aircraft engine lubricating oil is believed to be caused by mixing of air and oil by the scavenge pump in withdrawing oil from the engine oil sump. Excessive foaming has been found to lead to loss of oil due to escape of oil froth through vent holes and the like. Further, after prolonged foaming, the pressure feed pump may encounter a mixture of air and oil and as a result may no longer be able to supply the necessary lubrication required by the bearings and other working parts of the engine.

The presence of water in the oil also appears to enhance the formation of foam in aircraft lubricating systems, probably due at least in part to boiling of the water within the hot oil as reduced atmospheric pressures are encountered at high altitudes.

It is an object of the present invention to provide an apparatus whereby the foaming of lubricating oil in lubricating systems may be controlled and the deleterious effects of excessive foaming avoided. A further object is to provide apparatus for this purpose particularly adapted for use with internal combustion engines and which may be easily attached to existing internal combustion engines. Another object is to provide an anti-foaming device which utilizes waste energy developed in a lubricating system as its source of energy. Still another object is to provide a defoaming device for lubricating systems which is entirely automatic in action and does not require any attention on the part of the operator, this being an important factor in the operation of aircraft engines.

Other objects, together with some of the advantages to be derived from utilizing the present invention, will become apparent from the following detailed description thereof, reference being had to the accompanying drawing, which constitutes a part of this specification, and wherein:

The figure in the drawing is a schematic elevation of an embodiment of the invention.

It has been found that an oil foam may be broken by passing the same suddenly into a zone of reduced pressure, i. e. a zone which is maintained at a pressure less than that of the region wherein the foam is formed. The pressure differential necessary for operation according to the present invention has been found to be relatively small, approximately ½ p. s. i. producing optimum results in most instances, although as little as ¼ p. s. i. has been found satisfactory in many applications. Higher pressure differentials may, of course, also be utilized, although a greater differential than approximately 2 p. s. i. is generally preferably avoided for reasons which will be pointed out hereinafter.

Referring to the particular embodiments of the invention shown in the drawing an internal combustion engine 1 is provided with a lubricating system comprising an oil sump 2, a conduit 3, including a scavenge pump 4, leading to an oil cooler 5. Conduit 6 leads from oil cooler 5 to an oil supply tank 7 from whence conduit 8 feeds oil to a pressure pump 9. Oil is supplied to the working parts of engine 1 by means of pressure pump 9 and conduits 10 and 10a. Oil drains from the working parts of the engine back into oil sump 2. A foam breaking chamber 13 is positioned above oil supply tank 7 and is provided with a return conduit 14 leading to the interior of oil supply tank 7. A suction line 15 leads from the top of foam breaking chamber 13 to a point above the surface of the oil level in oil supply tank 7. A funnel head 16 or similar device may be provided at the end of conduit 15 and within the oil supply tank 7. An aspirator 11 is provided in conduit 6, the suction line 12 of the aspirator 11 being connected to foam breaking chamber 13.

The operation of the foam controlling device is as follows: As the oil circulates in the lubricating system, foam forms in the various parts of the system, particularly in the scavenge pump 4, and eventually separates from the oil and collects on the surface of the oil level in oil supply tank 7, this region being designated as a "foam accumulation region." As a result of the action of aspirator 11, air is withdrawn from foam breaking chamber 13, resulting in a reduced pressure therein, and simultaneously foam collected on the surface of the oil in oil supply tank 7 is drawn through conduit 15 and discharged into foam breaking chamber 13. The capacity of aspirator 11 is such that the normal flow of fluid through conduit 6 will result, preferably, in the maintenance of a reduced pressure of at least approximately ½ p. s. i. under the atmospheric pressure above the oil level in oil supply tank 7. A throttling valve 20 may be provided in conduit 15, if desired, in order to vary the pressure maintained in foam breaking chamber 13.

Foam which is passed into foam breaking chamber 13 through conduit 15 is thus subjected to conditions such as will hereinafter be designated as "shock depressurizing." This is to be clearly distinguished from the subjection of the foam to a reduced pressure in the ordinary sense of meaning. It has been found that foam may be efficiently broken by suddenly introducing the same into an expansion zone having a slightly lesser pressure than that of the foam under equilibrium conditions. Foam breaking by shock depressurizing according to the present invention, therefore, comprises essentially the introduction of foam under more or less equilibrium conditions into an expansion zone of lesser pressure with sufficient rapidity to bring about disruption of the foam cells before equilibrium conditions re-establish themselves. In this manner, as has been pointed out above, foam may be satisfactorily broken by subjecting it to a sudden pressure reduction of as little as ¼ p. s. i.

Oil collecting in the bottom of foam breaking chamber 13 is returned to oil supply tank 7 through conduit 14. Since there is always a reduced pressure within foam breaking chamber 13, it is necessary to position the chamber high enough above the oil level in oil supply tank 13 to provide a sufficient liquid head within conduit 14 to counterbalance the reduced pressure maintained. For practical purposes this will be found to amount to approximately 3 feet per pound pressure differential. In other words, if the foam controlling system is designed to operate at ½ p. s. i. pressure differential, the foam breaking chamber should be positioned about 1½ feet above the liquid level in the oil supply tank. For a system designed to operate at 2 p. s. i. pressure differential, the foam breaking chamber should be placed about 6 feet above the liquid level in the oil supply tank. Pressure differentials of more than 2 p. s. i. are usually considered to be neither necessary nor desirable, since a differential of 2 p. s. i. has been satisfactory for practical foam breaking purposes, and in the embodiment of the invention shown in the figure utilization of greater pressure differentials involves the positioning of the foam breaking chamber at undesirable heights above the oil level of the oil supply tank in order to insure drainage of defoamed oil from the foam breaking chamber to the oil supply tank.

Although the invention has been described particularly in relation to its adaptation to the lubrication systems of internal combustion engines, it is to be understood that the principles set forth may be applied to the lubrication system of any type of engine and in general to any lubricating system for engines or other machinery wherein there is a tendency for the oil to foam. As has been disclosed above, such foaming may be controlled by subjecting the foam to shock depressurizing, this treatment being most advantageously carried out by withdrawing foam from a foam accumulation region of the lubricating system, passing the foam into a reduced pressure zone under shock depressurizing conditions and returning defoamed oil from the reduced pressure zone to the lubricating system.

I claim as my invention:

1. In an engine lubricating system provided with an oil tank wherein foam accumulates and means to circulate oil to said tank through said system and back to said tank, including conduit means, means for breaking said foam comprising a shock depressuring chamber, an aspirator for maintaining the pressure in said shock depressuring chamber at least ¼ p. s. i. below that in said tank, said aspirator including part of said conduit means.

2. Apparatus according to claim 1 wherein said aspirator is adjacent said tank in the conduit means conveying the oil back to said tank.

3. Apparatus according to claim 1 wherein the pressure in said shock depressuring chamber is not more than about 2 p. s. i. below that in said tank.

WILLIAM M. MALOTT.